United States Patent [19]

Del Fabro et al.

[11] Patent Number: 5,025,651
[45] Date of Patent: Jun. 25, 1991

[54] MOVABLE SHEARS UPSTREAM OF A BENDING ASSEMBLY AND METHOD TO BEND THE TRAILING END OF BARS

[75] Inventors: Marcello Del Fabro, Udine; Giorgio Del Fabro, Cassacco-Fraz, both of Italy

[73] Assignee: M.E.P. Macchine Elettroniche Piegatrici SpA, Udine, Italy

[21] Appl. No.: 463,314

[22] Filed: Jan. 10, 1990

[30] Foreign Application Priority Data

Jan. 18, 1989 [IT] Italy .................................. 15903 A/89

[51] Int. Cl.⁵ ............................................ B21D 7/024
[52] U.S. Cl. ........................................ 72/294; 72/307;
72/203; 72/217
[58] Field of Search ................. 72/294, 307, 131, 149,
72/159, 214–219, 386–388, 203, 403, 335, 337;
140/102, 105

[56] References Cited

U.S. PATENT DOCUMENTS

| | | | |
|---|---|---|---|
| 1,954,791 | 4/1934 | Almgren | 72/403 |
| 3,269,164 | 8/1966 | Rutter | 72/294 |
| 3,438,233 | 4/1969 | Manning | 72/219 |
| 3,762,196 | 10/1973 | Kempken | 72/294 |
| 4,280,350 | 7/1981 | King | 72/7 |
| 4,681,210 | 7/1987 | Miki | 72/307 |
| 4,823,577 | 4/1989 | Kawashima | 72/339 |

FOREIGN PATENT DOCUMENTS

| | | | |
|---|---|---|---|
| 15354 | 9/1980 | European Pat. Off. | 72/387 |
| 3123558 | 1/1983 | Fed. Rep. of Germany | 72/217 |
| 150725 | 7/1986 | Japan | 72/387 |

Primary Examiner—Daniel C. Crane
Attorney, Agent, or Firm—Antonelli, Terry, Stout & Kraus

[57] ABSTRACT

Movable shears and a method for the automatic or non-automatic bending of the trailing end of bars in bending-shaping machines having a bending assembly located downstream of a shears (24) and of a bar feeder unit are disclosed. The bars may be already straightened or already straightened and sheared to size or may require straightening and the bar (29), after the required bends have been applied to its leading end (T), is fed forwards with a movement of distancing of its leading end (T) by an appreciable length at least partly by the feeder unit. When this forward length of feed has been completed, the bar (29) is sheared by the shears (24), thus creating a trailing end (C) of the residual bar (129). The movable shears (24) are able to slide on a longitudinal slide block (45) which is positioned as required in a direction lengthwise to the bar (29) so as to determine the length of the trailing end (C) of the residual bar (129) in relation to the bending assembly (35).

11 Claims, 3 Drawing Sheets

MOVABLE SHEARS UPSTREAM OF A BENDING ASSEMBLY AND METHOD TO BEND THE TRAILING END OF BARS

This invention concerns a shears unit of a movable type for shearing to size, which is positioned upstream of a bending assembly in an automatic or non-automatic bar bending-shaping machine having a bending assembly located downstream of at least one bar feeder unit, a shears being included.

The invention concerns also a method to bend the trailing end of bars in an automatic or non-automatic bar bending-shaping machine with a bending assembly located downstream of the shears and with a bar feeder unit upstream of the shears.

The bending-shaping machines to which the invention is applied have the purpose advantageously, but not only, of producing reinforcing bars with one or more bends in the end which is sheared last. They can also be employed to bend solid or hollow bars of any type with bends having a clockwise and/or anticlockwise development.

The bars which can be bent with the bending-shaping machines to which the invention is applied can be already straightened or already straightened and sheared to size or may require straightening.

One type of bending-shaping machine to which the invention is applied comprises one single bending assembly located imemdiately downstream of a shears and processes bars fed continuously and passing normally beforehand through a straightening assembly forming part of the same machine and performing also the function of a feeder unit.

The invention is therefore applied to automatic and non-automatic bar bending-shaping machines including a bending assembly which may comprise either a bending disk able to move orthogonally to the direction of feed or a stationary bending disk.

Moreover, the bending disk may be axially stationary or able to move axially or to rock.

Furthermore, the bending disk may be of a type bearing only a bending pin and therefore cooperating with stationary contrast and shaping cams, or else it may comprise a bending pin and a contrast roll solidly fixed to the bending disk itself.

The bending-shaping machines to which the invention can be applied are able to process one or more bars at a time automatically or not automatically.

By the word "bars" in this invention we mean substantially filiform elements produced by rolling, extrusion, drawing or forming and having any required section (round, square, rectangular, hexagonal, oval, etc.) including even external ribs. The section of the bars may be solid or hollow.

EP-A-3-88576 discloses a bending-shaping machine with a bending assembly, in which strip material is fed continuously; the machine is suitable to make the required bends in the strip material automatically. This document teaches the positioning of a movable shears on a support arranged transversely and above the bending plane. This embodiment is very restrictive since the permitted bends are very small and therefore not enough to cover the wide ranges required in modern technology.

Our invention has the purpose of producing the required bends automatically or otherwise at both ends of one or more bars; hereinafter the word "bar" shall be taken as always meaning "one or more bars".

The bar according to this invention also has a substantial distance between the two ends of two successive bends and this distance must not be less than at least half a meter in the normal dimensions for a bending-shaping machine according to this invention.

The device according to the invention and the method which can be obtained with that device are shown and characterized in the respective main claims, while the dependent claims show variants of the idea of the solution.

One embodiment of the invention provides for the shears to be able to move along the axis of feed of the bar upstream of the bending assembly and to be actuated by a slider element or carriage able to slide in cooperation with a working platform.

According to a first embodiment the shears can move by a maximum determined length and can be positioned as required in any intermediate position.

According to a variant, when the shears has performed the shearing, it retreats momentarily by a small value to enable the trailing end of the residual bar to be disengaged from the shears so that the bar can rotate freely during the bending step.

According to a further variant the shears not only can move lengthwise to the feed but also has a first shearing position and a second retracted position that frees the upper surface of the working platform so as to allow the trailing end of the residual bar to pass freely. In this second inactive position of non-contact the shears is located advantageously, but not only, below the upper level of the working platform.

The movable shears according to the invention enables the residual trailing end of the bar to be sheared from the bar to the required length to permit the required bends in the trailing end of the residual bar.

According to another variant a drawing unit is included downstream of the bending assembly and can be actuated to act on the bar so as to position it correctly for performance of the required bends in the trailing end of the residual portion of the bar.

Let us now see a preferred embodiment of the invention with the help of the attached figures, which are given as a non-restrictive example and in which.

In the attached figures the invention is applied to a specific automatic bending-shaping machine to which is fitted a shears 24 able to move along the axis of a bar 29.

It is also possible to apply the invention to other types of automatic bending-shaping machines as defined earlier.

Figure 1:
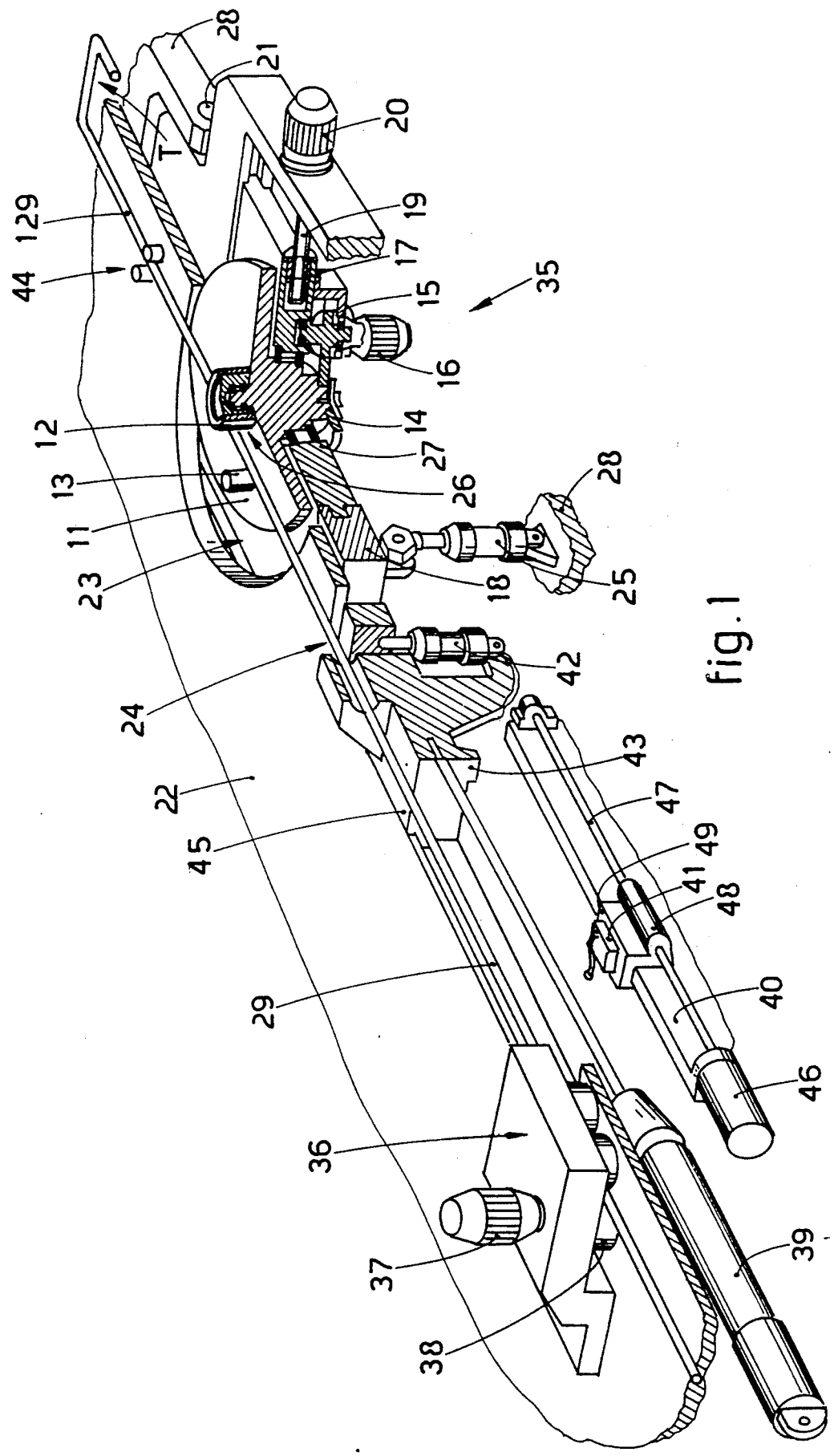
FIG.1 shows a three-dimensional, partly cutaway diagram of part of the bending-shaping machine that employs the invention.

In FIG.1 the bar 29 is fed continuously in a defined straightened condition and cooperates in its advance with the shears 24 located immediately upstream of a bending assembly 35.

The shears 24 can move along the axis of the bar 29 by a determined maximum length. Within this maximum length of travel the shears 24 can be positioned as required in any terminal or intermediate position.

Figure 3:
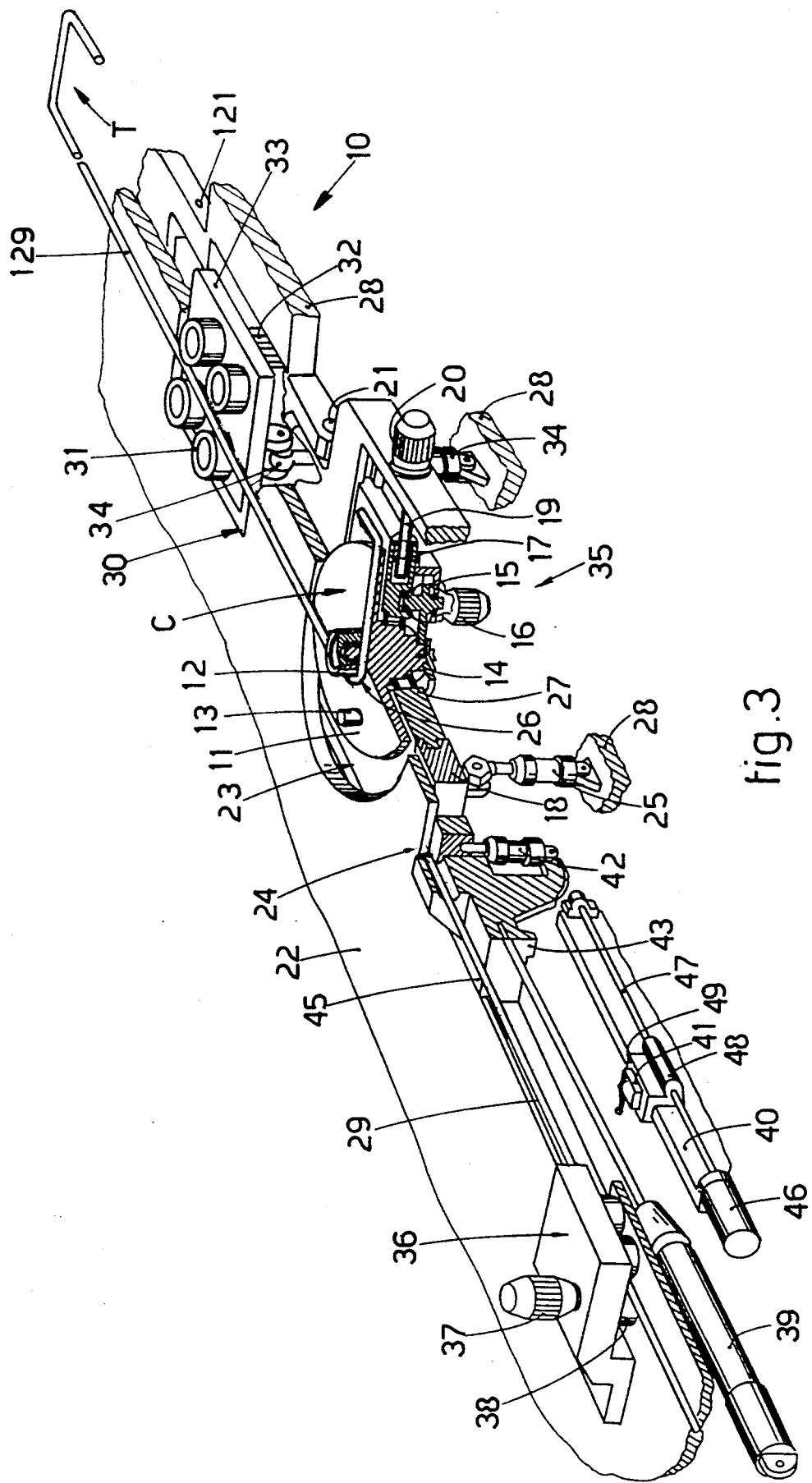
FIG.3 shows the embodiment of FIG.1 with a retractable drawing unit fitted downstream of a bending assembly.

The bending assembly 35 of the type shown as an example is the subject of a parallel right belonging to the present applicant and is illustrated in FIGS.1 and 3.

A drawing unit 10 too shown in FIG.3 is the subject of an independent, parallel patent application in the name of the present applicant.

The bending assembly 35 shown comprises a bending disk 11 with an axial contrast roll 12 and a bending pin 13. The bending disk 11 is supported rotatably on a slider element 27, which can slide on appropriate guides in a rocker base 18 and takes up in relation to that base at least two positions suitable to make clockwise and anticlockwise bends respectively.

The rocker base 18 is secured to a rocker frame 28 in a direction substantially normal to a working platform 22 by means of a rocker pivot 21 located downstream of the bending disk 11. The rocking movement of the rocker base 18 is produced in this example by a first rocker cylinder/piston assembly 25.

The rocker pivot 21 is positioned downstream of the bending assembly 35 and substantially normal to the bar 29 and parallel to the working platform 22.

The slider element 27 is driven by a first motor 20 of any required type, while the working platform 22 includes a hollow 23 suitable to accommodate the terminal positions of the bending disk 11.

In the example shown the first motor 20 is of a rotary type that drives a threaded bolt 19 which by meshing with an internally threaded sleeve 17 conditions the lengthwise position of the slider element 27 within the rocker base 18.

Rotation of the bending disk 11 is achieved by means of a driven toothed wheel 14 actuated by a powered toothed wheel 15 which in turn is driven by a second motor 16.

The means supplying motion and the transmission and/or control means are shown here as an example so as to clarify the method of working of the invention but can be replaced by any other drive, transmission and/or control means suitable for the purpose, and the same applies to any drive, transmission and/or control means mentioned in this description.

FIG.1 shows a drawing unit 36 located upstream of the movable shears 24. This drawing unit 36 can be independent and perfom only the task of drawing the bar 29 or may form part or be replaced by a continuous straightening assembly, which should be comprised advantageously in the bending-shaping machine we are describing.

According to the example shown the drawing unit 36 includes in this case rolls 38 driven by a third motor 37 and able to act on the bar 29.

The movable shears 24 is located upstream of the bending assembly 35 and in the example shown comprises a slide block 45 able to slide in guides positioned in cooperation with the working platform 22.

Lengthwise movement of the slide block 45 according to this example is obtained by means of a second cylinder/piston actuator assembly 39. In this case the slide block 45 comprises a positioner projection 43, which abuts against a positioner abutment 41 and halts the slide block 45 in the required position for the shears 24.

The positioner abutment 41 can be moved and positioned as required by a slider 49 on a guide 40. The movement and positioning of the slider 49 are obtained with a fourth motor 46 that actuates a screw 47 which cooperates with an internally threaded sleeve 48 of the slider 49.

According to the invention the movable shears 24 can be positioned as desired in relation to the bending assembly 35 within the limits determined by the minimum and maximum distances of the movable shears 24 from the bending assembly 35. In this way the length of the trailing end "C" of the residual bar 129 determined by the actuation of the shears 24 by a third cylinder/piston actuator assembly 42 can be varied as required and will not be a constant length as occurs at the present time.

In this way, after the required bends have been made in the leading end "T" of the bar 29, it is also possible to produce bends 26 and/or 126 and possibly also other clockwise and anticlockwise bends in the trailing end "C" of the bar with desired and even considerable distances.

According to a variant, when the trailing end "C" has been sheared, the slide block 45 retreats momentarily by a desired length before taking up the pre-set shearing position again. The length of this retreat may range between a few millimeters and the distance to the end of travel farthest from the bending assembly 35.

Figure 2:
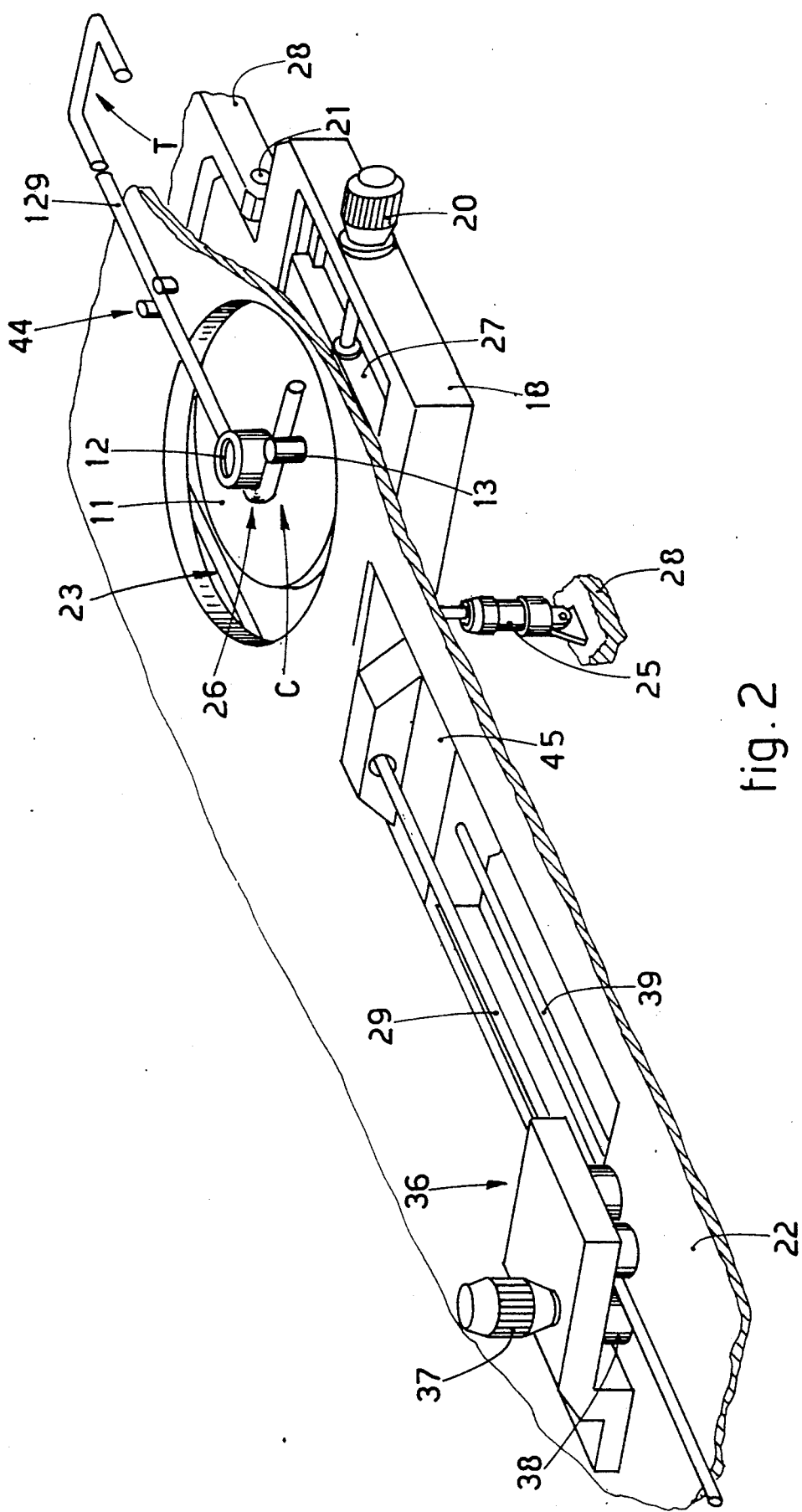
FIG.2 shows the embodiment of FIG.1 with some bends made in the leading and trailing ends of the bar.

With the embodiment of FIGS.1 and 2 it is possible to produce the bend 26 in the trailing end "C" of the bar only with the inclusion of retractable abutment pins 44, which oppose sideways movement of the residual bar 129 during the bending step. These abutment pins 44 can be made to retract with an axial movement or with a sideways overturning movement.

The actuation which determines the working position and the retracted position of the abutment pins 44 away from the upper working platform 22 can be provided with any actuation means (not shown here); for instance, a cylinder/piston actuator assembly may be employed.

According to the variant of FIG.3 the drawing unit 10 is located downstream of the bending assembly 35 and cooperates with the nominal axis at least of the residual bar 129 when it is in its working position.

In this example the drawing unit 10 comprises pairs of entraining rolls 31 which may be thrust resiliently towards each other so as to mate together and draw actively at least the residual bar 129 when so required.

The entraining rolls 31 may all be powered or some may be powered, for instance by a fifth motor 32 suitable for the purpose. In the example shown the entraining rolls 31 have their axes normal to the working platform 22 and are upheld on a support 33, which too in this example is capable of being rocked at 121 with the rocker pivot 21 which secures the support 33 to the frame 28.

The rocking movement of the support 33 is achieved with a fourh cylinder/piston rocker assembly 34 or another suitable means such as a cam or another means. The support 33 can be accommodated within a lodgement opening 30 machined in the working platform 22.

When the drawing unit 10 is fully retracted below the working platform 22, a levelling closure may be provided to close the lodgement opening 30.

The drawing unit 10 cooperates with a measurement unit that determines the length of drawing of the bar 29. This measurement unit, which is not shown here, takes into account the distance between the axis of the bending disk 11 and the position of the drawing unit 10.

According to a variant the shears 24 can not only move but also be retracted. When the shears 24 is retractable, the length of the sides of the bends in the trailing end "C" of the bar becomes free of structural conditionings by the bending-shaping machine and therefore the distance between the bends can be considered.

When the movable shears 24 has defined the trailing end "C" of the residual bar 129, the drawing unit 10 positions the trailing end "C" of the residual bar 129 and determines a first bend 26 and thereafter a second bend 126.

If the movable shears 24 is retractable, the length of the sides of the bends made in the trailing end "C" of the bar is free of conditioning, whereas if the movable shears 24 is not retractable, the maximum length of the sides of the bends made in the trailing end "C" is determined by the momentary position of the movable shears 24 or by the temporary position of maximum retreat of the movable shears 24.

We claim:

1. A method for bending of a trailing end of bars in a bending-shaping machine having a bar feeder unit for feeding bars in a longitudinally extending feed direction, movable shears provided on a slide block slidable along an axis of said longitudinally extending feed direction, and a bending assembly provided downstream of said shears and of said feeder unit with respect to said longitudinally extending feed direction, said method comprising:

feeding a bar in said longitudinally extending feed direction until a leading end is at said bending assembly;

bending said leading end of said bar with said bending assembly;

feeding said bar at least partly using said feeding unit in said longitudinally extending feed direction;

positioning said slide block and movable shears to a predetermined position along said axis of said longitudinally extending feed direction;

shearing said bar with said movable shears to form a trailing end of said bar, a length of said trailing end being determined by a distance between said bending assembly and said movable shears; and laterally holding said bar by abuttment pins located downstream of said bending assembly and bending said trailing end of said bar while laterally holding said bar by said abuttment pins.

2. A method according to claim 1, further comprising, after said shearing of said bar with said movable shears to form said trailing end of said bar, moving said movable shears a predetermined distance away from said trailing end of said bar in a direction upstream from said trailing end of said bar.

3. A method according to claim 1, wherein said feeder unit is a drawing unit and wherein said bar is drawn while being fed in said longitudinally extending feed direction.

4. A method according to claim 1, wherein said feeder unit is a continuous straightening assembly and wherein said bar is straightened while being fed in said longitudinally extending feed direction.

5. A method for bending of a trailing end of bars in a bending-shaping machine having a bar feeder unit for feeding bars in a longitudinally extending feed direction, movable shears provided on a slide block slidable along an axis of said longitudinally extending feed direction, and a bending assembly provided downstream of said shears and of said feeder unit with respect to said longitudinally extending feed direction, said method comprising:

feeding a bar in said longitudinally extending feed direction until a leading end is at said bending assembly;

bending said leading end of said bar with said bending assembly;

feeding said bar at least partly using said feeding unit in said longitudinally extending feed direction;

positioning said slide block and movable shears to a predetermined position along said axis of said longitudinally extending feed direction;

shearing said bar with said movable shears to form a trailing end of said bar, a length of said trailing end being determined by a distance between said bending assembly and said movable shears; and after said shearing of said bar with said movable shears to form said trailing end of said bar, feeding said bar in said longitudinally extending feed direction by a drawing unit located downstream of said bending assembly, said drawing unit comprising at least one pair of rollers, and bending said trailing end of said bar while laterally holding said bar between said at least one pair of rollers.

6. A method according to claim 5, further comprising, after said shearing of said bar with said movable shears to form said trailing end of said bar, momentarily withdrawing said shears to a position below a level of said trailing end of said bar.

7. A method according to claim 5, further comprising engaging said bar with said drawing unit while shearing said bar with said movable shears to form said trailing end of said bar, and, thereafter, feeding said bar in said longitudinally extending feed direction with said drawing unit.

8. Movable shears of a bending-shaping machine for bending bars having a working platform, a feeder unit for feeding said bars in a longitudinally extending feed direction, and bending means for bending said bars located downstream with respect to said feed direction of said feeder unit, comprising:

guide means for guiding said movable shears provided below said working platform;

a slide block provided on said guide means such that said slide block is able to move on said guide means along an axis of said longitudinally extending feed direction upstream of said bending means;

shears fitted to said slide block for shearing said bars; and retractable abutment pins downstream of said bending assembly which may momentarily cooperate with said bar to laterally hold said bar while said bending means bends a trailing end of said bar.

9. Movable shears according to claim 8, wherein said slide block is provided on said guide means such that it may move on said guide means along said axis of said longitudinally extending feed direction to a predetermined momentary shearing position and may move further upstream of said predetermined momentary shearing position to a momentary retreat position.

10. Movable shears of a bending-shaping machine for bending bars having a working platform, a feeder unit for feeding said bars in a longitudinally extending feed direction, and bending means for bending said bars located downstream with respect to said feed direction of said feeder unit, comprising:

guide means for guiding said movable shears provided below said working platform;

a slide block provided on said guide means such that said slide block is able to move on said guide means along an axis of said longitudinally extending feed direction upstream of said bending means;

shears fitted to said slide block for shearing said bars; and a drawing unit downstream of said bending assembly for at least momentarily drawing said bar, said drawing unit comprising at least one pair of rollers for holding said bar therebetween while a trailing end of said bar is bent by said bending means.

11. Movable shears according to claim 10, further comprising means for positioning said shears below said working platform.

* * * * *